No. 761,836. PATENTED JUNE 7, 1904.
W. D. HODSON.
CARPET SWEEPER.
APPLICATION FILED JUNE 25, 1903.
NO MODEL.

Witnesses.
Edward T. Wray
Homer L. Kraft

Inventor.
Walter D. Hodson.
by Parker Carter
their Attorneys.

No. 761,836. Patented June 7, 1904.

UNITED STATES PATENT OFFICE.

WALTER D. HODSON, OF MARION, INDIANA, ASSIGNOR TO PHILIP MATTER AND BENJAMIN F. BURK, COPARTNERS TRADING AS NATIONAL SWEEPER COMPANY, OF MARION, INDIANA.

CARPET-SWEEPER.

SPECIFICATION forming part of Letters Patent No. 761,836, dated June 7, 1904.

Application filed June 25, 1903. Serial No. 163,029. (No model.)

*To all whom it may concern:*

Be it known that I, WALTER D. HODSON, a citizen of the United States, residing at Marion, in the county of Grant and State of Indiana, have invented a certain new and useful Improvement in Carpet-Sweepers, of which the following is a specification.

My invention relates to carpet-sweepers, and has for its object to provide certain new and useful improvements therein relating particularly to the pans or means for dumping the same toward the center.

My invention in one form is illustrated in the accompanying drawings, wherein—

Figure 1:
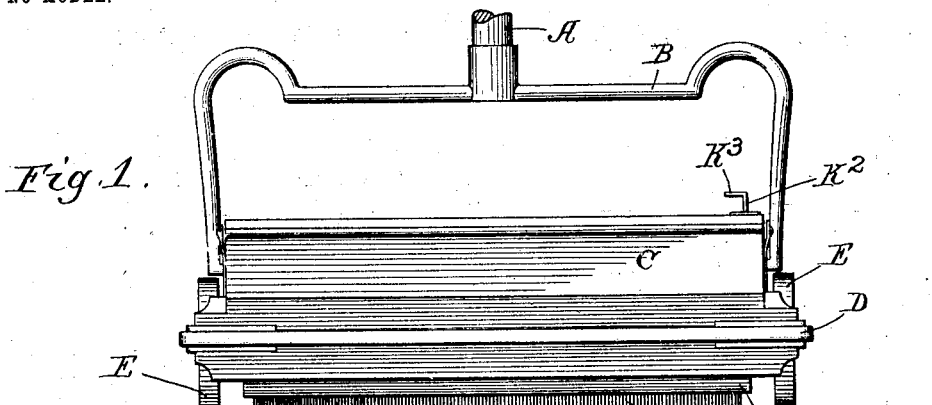
Figure 2:
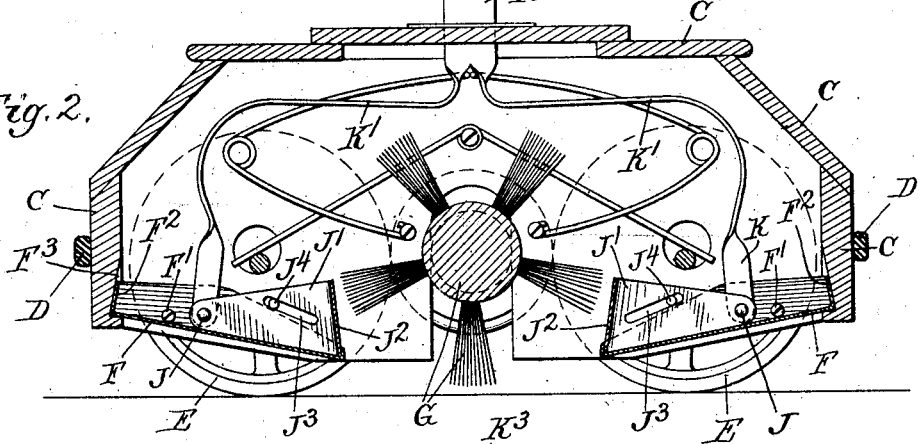
Figure 3:
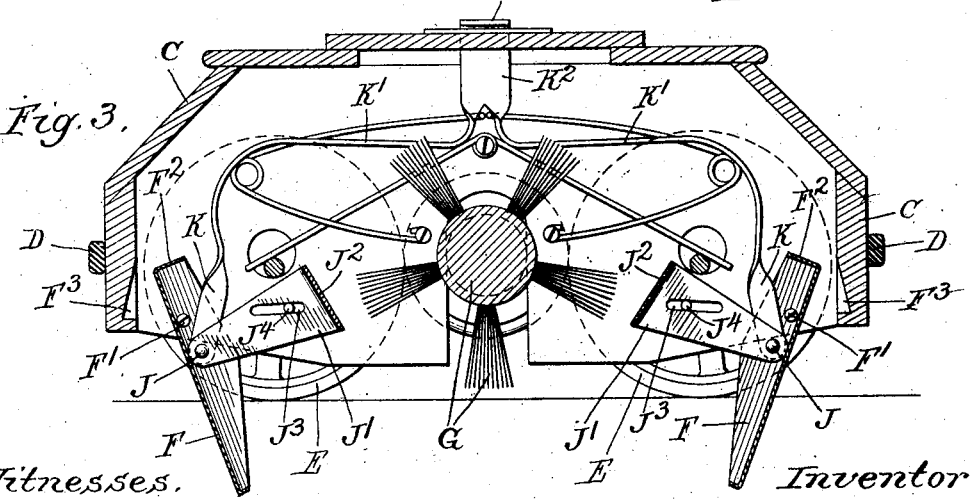

Figure 1 is a front elevation. Fig. 2 is a cross-section. Fig. 3 is a like cross-section with the pans tilted.

Like parts are indicated by the same letters in all the figures.

A is the handle; B, the bail; C, the case or cover; D, the elastic band which surrounds the body of the case or cover; E E, the supporting-wheels; F, one of the pans, and G the brush. The pan F is mounted on the pivot $F'$, which projects into the ends of the case, has an upwardly-turned edge $F^2$ at its inner end, and is adapted to seat in the notch $F^3$ in the side of the case C. Pivoted to the pan F at J is the pan-guard, consisting of the arms $J'$ $J'$ and the forward portion $J^2$, which, as indicated in Fig. 2, when the pan is in its normal position serves in lieu of or acts as the forward portion of the pan. The arms of the pan-guard are slotted at $J^3$, and through each slot projects from the case the pin $J^4$. Thus when the pan is tilted, as indicated in Fig. 3, the pan-guard is lifted into the position shown. Secured to the pan, preferably at the pivot-points J, is one arm K of the yoke $K'$. This yoke terminates above in the vertical piece $K^2$, which projects through the case and itself terminates in the foot or finger piece $K^3$.

It is obvious that the device might be considerably altered without departing from the spirit of my invention, and I wish the particular form described to be considered as merely illustrative of my invention.

The use and operation of my invention are obvious from the foregoing description. When the parts are in their normal position, as shown in Fig. 2, the sweeper contains two well-defined complete pans, each adapted to receive its load and to retain it. The pan projects into the case and forms a close joint therewith, while at its forward end it is provided with a close-fitting guard or piece to complete the pan. When the pans are to be dumped by depressing the foot-piece $K^3$, the yoke is depressed, and since the yoke makes engagement with the pans at a distance from their pivots they will be forced downwardly into the position shown in Fig. 3, thus dumping the matter which they contain toward the center or toward the brush. This motion also raises the pan-guards, as indicated in Fig. 3, so that the material can fall out.

I claim—

1. In a carpet-sweeper, the combination of two inwardly-dumping pans, with pan-guards, and means for lifting such pan-guards away from the pans when the latter are depressed.

2. In a carpet-sweeper, the combination of a case with two inwardly-dumping pans, and pan-guards for their forward ends pivoted to the pans at one end and loosely secured to the case toward the other end.

3. In a carpet-sweeper, the combination of a case with two inwardly-dumping pivoted pans, and two pan-guards, pivoted each to its pan and attached by a sliding connection to the sweeper-case.

4. In a carpet-sweeper, the combination of a case with a pan pivoted to the case, and dumping means, a pivotal connection between the pan and such dumping means, such pivotal connection being located between the pan-pivot and the brush, and a pan-guard pivoted to the pan and loosely connected with the case.

5. In a carpet-sweeper, the combination of a case with a pan pivoted to the case, and dumping means, a pivotal connection between the pan and such dumping means, such pivotal connection being located between the pan-pivot and the brush, and a pan-guard pivoted to the dumping means and loosely connected with the case.

6. In a carpet-sweeper, the combination of a case with a pan pivoted to the case, and dumping means, a pivotal connection between the pan and such dumping means, such pivotal connection being located between the pan-pivot and the brush, and a pan-guard attached to the same pivot as that which connects the pan and the dumping means and loosely connected with the case.

7. In a carpet-sweeper, the combination of a case with a tilting inwardly-dumping pan, and a tilting pan-guard, the two being pivoted together and each pivotally connected with the case and one of them having a sliding connection with the case.

WALTER D. HODSON.

Witnesses:
CHARLES W. HALDMAN,
PHILIP MATTER.